(12) United States Patent
Bonada Bo et al.

(10) Patent No.: US 11,220,033 B2
(45) Date of Patent: Jan. 11, 2022

(54) COMPUTER IMPLEMENTED METHOD FOR GENERATING A MOLD MODEL FOR PRODUCTION PREDICTIVE CONTROL AND COMPUTER PROGRAM PRODUCTS THEREOF

(71) Applicant: FUNDACIO EURECAT, Cerdanyola del Valles (ES)

(72) Inventors: Francesc Xavier Bonada Bo, Ripoll (ES); Francisco Javier Planta Torralba, El Masnou (ES); Gabriel Amilcar Anzaldi Varas, Vilafranca del Penedes (ES)

( * ) Notice: Subject to any disclaimer, the term of this patent is extended or adjusted under 35 U.S.C. 154(b) by 0 days.

(21) Appl. No.: 16/635,497

(22) PCT Filed: Jul. 26, 2018

(86) PCT No.: PCT/EP2018/070349
§ 371 (c)(1),
(2) Date: Jan. 30, 2020

(87) PCT Pub. No.: WO2019/025292
PCT Pub. Date: Feb. 7, 2019

(65) Prior Publication Data
US 2020/0230857 A1    Jul. 23, 2020

(30) Foreign Application Priority Data

Feb. 8, 2017    (EP) .................................... 17382532

(51) Int. Cl.
*G05B 13/02* (2006.01)
*B29C 45/76* (2006.01)
*G05B 19/00* (2006.01)

(52) U.S. Cl.
CPC ........ *B29C 45/766* (2013.01); *G05B 13/0265* (2013.01); *G05B 19/00* (2013.01);
(Continued)

(58) Field of Classification Search
CPC ........ B29C 45/766; B29C 2945/76006; B29C 2945/7604; B29C 2945/7612;
(Continued)

(56) References Cited

U.S. PATENT DOCUMENTS

2002/0055806 A1* 5/2002 Brown ................ B29C 45/7686
700/197
2003/0046382 A1* 3/2003 Nick .................. G05B 23/0283
709/224
(Continued)

FOREIGN PATENT DOCUMENTS

CN    B-103313421    9/2013
EP    A1-3011724    4/2016
(Continued)

*Primary Examiner* — Christopher E. Everett
(74) *Attorney, Agent, or Firm* — Eugenio J. Torres-Oyola; Victor M. Rodriguez-Reyes; Rafael Rodriguez-Muriel

(57) ABSTRACT

A computer implemented method for generating a mold model for production predictive control and computer program products thereof. The method comprises receiving first parameters about molding machine sensors and second parameters about mold cavity; classifying each injection cycle of a plurality of injection cycles of a first injection molding machine considering the first and second parameters and quality or characteristics of injected given parts in the machine; processing the first and second parameters to remove undesired or irregular data values thereof; merging the first and second parameters providing a global group of processed parameters; executing a machine learning algorithm on the global group of processed parameters generating an extended mold model; and using said generated extended mold model for further monitoring and control of the mold in further injection processes in the first injection molding machine and/or for optimizing a production process of the mold in the first molding machine.

16 Claims, 3 Drawing Sheets

(52) U.S. Cl.
CPC ............... *B29C 2945/7604* (2013.01); *B29C 2945/76006* (2013.01); *B29C 2945/7612* (2013.01); *B29C 2945/76949* (2013.01)

(58) Field of Classification Search
CPC ........... B29C 2945/76949; B29C 2945/76913; B29C 2945/76936; B29C 2945/76943; B29C 45/76; G05B 19/00; G05B 13/0265
See application file for complete search history.

(56) References Cited

U.S. PATENT DOCUMENTS

| | | | | |
|---|---|---|---|---|
| 2008/0111264 | A1* | 5/2008 | Esser | B29C 45/84 264/40.1 |
| 2008/0290541 | A1* | 11/2008 | Baumann | B29C 45/2725 264/40.6 |
| 2018/0307218 | A1* | 10/2018 | Lavid Ben Lulu | G06N 5/003 |

FOREIGN PATENT DOCUMENTS

| | | |
|---|---|---|
| ES | A1-2532750 | 1/2016 |
| JP | A-2017081071 | 5/2019 |
| WO | WO-A1-2002004186 | 1/2002 |
| WO | WO-A1-2012067727 | 5/2012 |
| WO | WO-A1-2011050467 | 4/2014 |
| WO | WO-A1-2017031623 | 3/2017 |

\* cited by examiner

COMPUTER IMPLEMENTED METHOD FOR GENERATING A MOLD MODEL FOR PRODUCTION PREDICTIVE CONTROL AND COMPUTER PROGRAM PRODUCTS THEREOF

TECHNICAL FIELD

The present invention is directed, in general, to process monitoring and optimization techniques applied to the manufacturing industry. In particular, the invention relates to a computer implemented method, and computer program products thereof, for generating a mold model for production predictive control.

BACKGROUND OF THE INVENTION

Industry 4.0 has emerged as the perfect booster for process monitoring and optimization techniques, aiming for Cyber Physical Systems enabling novel approaches based on Artificial Intelligence (AI), Machine learning and Data Mining.

The key element on this new industrial revolution is the data that has become available thanks to the process monitoring capabilities enabled by the Cyber Physical Systems distributed along the manufacturing processes.

These data enable advanced analysis that can drive to a change of paradigm of the Plastic Injection Moulding (PIM) monitoring and control, from the Statistical Process Control (SPC) to the use of AI and Machine Learning techniques that allow for a much more detailed and accurate study of the process.

There are known some patents or patents applications in the field.

Patent application US-A1-20080102147 discloses an apparatus for supporting a worker involved in operating an injection-molding machine that includes a neural network in which a prediction function is determined based on test molding. The worker enters a portion of a plurality of molding conditions in the form of a fixed value using a first input apparatus, thereby obtaining a relational graph of the remaining portion of the plurality of molding conditions and the predicted quality value in which the quality of a molded article is predicted.

Patent application US-A1-2002019674 relates to an intelligent control method for injection machine to transplant the intelligent control and prediction techniques of a neural network to an injection machine, which has been exemplified capable of deciding the quasi best machine parameters rapidly in couple processing cycles for increasing yield with least loss, and for detecting and adjusting conditions until a desired operation environment is obtained.

International patent application WO-A1-2012067727 describes methods, systems, and a computer-readable storage medium for controlling a discrete-type manufacturing process (e.g., an injection molding process) with a multivariate model. Data representing process parameters, operating parameters, or both of the manufacturing process are received. The received data is compared with a multivariate model that approximates the manufacturing process to provide a result. Upon the result of the comparing satisfying a condition, one or more values for a set of operating parameters for the manufacturing process are determined. When the one or more determined values for the set of operating parameters satisfies a criterion, at least one operating parameter of the manufacturing process is updated.

U.S. Pat. No. 7,632,438 B2 describes an injection molding system including a hot runner comprising a memory device configured to contain at least one process control parameter. The memory device may transmit a signal representative of the process control parameter to a machine controller associated with the injection molding system. The machine controller may generate control signal to operate the injection molding machine based on, at least in part, the signal from the memory device.

Patent application US-A1-20130245807 describes an iterative method for controlling and optimizing a production process of at least one of a material and a product formed out of the compound material. Thereby a production control unit is provided and three different parameter groups, namely indicating parameters, nominal parameters and correcting parameters are defined, wherein the indicating and nominal parameters may be selected out of a group comprising process parameters, material recipe parameters and product property parameters. The correcting parameters may be selected out of the group comprising process parameters and recipe parameters. As reference values, nominal parameters are provided to the production control unit. During a first production cycle, at least one indicating parameter is measured and the measured values are provided to the unit. If the values deviate to much from the nominal parameters, the unit afterwards sets at least one correcting parameter on basis of the indicating parameter and on basis of the nominal parameter, thereby concerning any interaction between different parameters due to changes of any parameter.

US-A1-20020055806 discloses an injection moulding system that optimizes the injection moulding process by removing selected articles from a plurality of articles produced cyclically and tests a plurality of physical properties of the removed articles including dimensions, weight and gloss, together with a plurality of process parameters such as nozzle pressure and nozzle temperature. Adjustment of the process is made automatically on the basis of up to three optimizers, including a case based reasoning optimizer, a fuzzy optimizer and a rule based reasoning optimizer, in order to achieve pre-set article properties. The optimizers can have confidence factors associated therewith, determined on the effect of previous process adjustments. This patent application does not remove undesired or irregular data values in received parameters nor works in the frequency domain. Moreover, in this patent application the pressure measures are taken in specific points whereas in the present invention the pressure measures are taken in the whole injection cycle, analyzing the complete cycle, thus obtaining a clearer picture of the process. Sampling the pressure values at reduced timestamps does not provide the same amount of information and is different of having the whole evolution of the pressure. In addition, present invention enables for applying signal processing techniques that can help to clean and smooth the received parameters and thus increasing its potential as information sources along the production cycle. Better input signals, thanks to the preprocessing, will lead to better models and better results. Furthermore, the present patent application by processing and modeling the incoming data into the frequency domain provides a handful set of advantages ranging from data compression to enable more accurate models by analyzing the cycle's frequency spectrum. Moreover, working on the frequency domain can boost computational performance of the system thanks to data compression and reduced number of coefficients.

JP-A-2017081071 relates to a molding support method for an injection molding machine suitable for use in optimizing molding conditions by using a neural network. In this patent application the quality of the mold piece is not evaluated. Moreover, this Japanese patent application is based on evaluating a data set obtained from a plasticization phase to assess if the plasticization is correct. Thus, this Japanese patent application focuses on a subpart of the injection molding process, for guarantying the correct plasticization of the polymer. While this approach is interesting, the quality of the molded part is not only determined by plasticization process but is also affected by the filling, packing and cooling phases of the injection molding cycle. On the contrary, present invention focuses on predicting the quality of the part (not the correct plasticization) considering the evolution of the key parameters of the process of the entire cycle, thus considering filling, packing and cooling. Present invention has a broader ambition for providing quality predictions rather that providing a sub-process control.

US-A1-20160274561 discloses a method of controlling a manufacturing process having a machine to form a material in to a component. The method comprises the steps of establishing an initial set of operating parameters for the machine, producing an initial component from the machine, inspecting the component to determine its acceptability relative to a desired component, determining a variation in the operating parameters to improve the acceptability of the component, effecting changes in the operating parameters and inspecting subsequent components to determine their acceptability. This US patent application uses a system of inspection of the molds that have been produced and is focused on providing repeatability to the process, not to predict quality in real time. Moreover, a valve pin parameter is always adjusted, which implies using hot runners. That is, the monitoring and control solution of US-A1-20160274561 focuses only on plastic injection process with hot runners. On the contrary, present invention determines the quality of the mold from the process parameters and does not need complementary systems to determine the quality during the production process. Present invention is much broader, considering both processes with and without hot runners.

The objective of both inventions is also different, while US-A1-20160274561 focuses on having the process as repeatable as possible; present invention focuses on offering a quality prediction of each one of the injected parts. US-A1-20160274561 describes both a novel valve pin mechanism and an inspection mechanism, focusing on image (X-ray). The set of data used is also different. Present invention is based on mold and machine data while US-A1-20160274561 takes the input data from the pin valve. Present invention inspection is also not only focusing on image. The optimization of the process in US-A1-20160274561 is made by adjusting the pin valve. Present invention recommendations are considering the machine parameters, thus attacking a broader spectrum of parameters. Signal processing is also not mentioned in US-A1-20160274561.

ES-A1-2532750 discloses a method and system based on the use of an intelligent module (computational) permanently installed in a production tool with the capacity to acquire and store production data and expert evaluation of results in each cycle in a learning stage, which generates an expert model to evaluate each production cycle in the autonomous manufacturing phase and orders the necessary control actions to the production machinery that incorporates this tool for the continuous optimization of the process. Because of the implementation of this Spanish patent application, the process control is done into a device attached into the mold. Thus, each mold requires an independent equipment to monitor the process. Present invention on the contrary has the capability of monitoring several molds in parallel. Moreover, present invention offers automatic model adjustment and optimization when conditions change (sensor disconnected, etc.). Likewise, present invention enables for applying signal processing techniques that can help to clean and smooth the received parameters and thus increasing its potential as information sources along the production cycle, and processes and models the incoming parameters into the frequency domain providing a handful set of advantages ranging from data compression to enable more accurate models by analyzing the cycle's frequency spectrum.

US-A1-20160121532 relates to a method for operating a machine for processing plastics and other plasticizable materials. This patent application focuses in the set-up phase of the machine. Based on the CAD design of the mould, the method estimates a configuration parameter of the process. Therefore, simulation tools are foreseen. On the contrary, the present invention is based on experimental data (data driven) and provides a real-time quality production monitoring and optimization system based on parameters acquired within each cycle data. Thus, full automatic part traceability and quality control can be established. Setup time is always smaller than production time, thus present invention solution helps where most matters.

Other patents or patent application known in the field are: WO-A1-2002004186, U.S. Pat. No. 7,580,771 B2, WO-A1-2011050467, WO-A1-2017031623, CN-B-103313421, U.S. Pat. No. 9,420,539 B2 and EP-A1-3011724.

However, quite often, due to production flexibility and scheduling, a mold needs to be installed in a different injection molding machine that the preferred one, for instance because the latter is already in use for another mold. Therefore, this situation requires for a new tuning process (from scratch) for the new pair mold-machine, involving a big waste of time, material and energy, which problem is addressed by this invention.

Moreover, because production control is fundamental for plastic injection processes new methods need to be provided.

DESCRIPTION OF THE INVENTION

Present invention has developed a tool for improving and speed-up the required tuning process when a mold is installed in a non-preferred injection molding machine. An object of the method proposed by present invention is to use the knowledge gained through the motorization of the mold in production, correlating mold cavity data and machine parameters through a generated extended mold model for providing tuning recommendations when the mold is installed in a non-preferred machine.

Besides, and because according to the plastic injection conditions it is more interesting to have a very good production control rather than speed up the setup time, the generated extended mold model can work in the first injection machine providing both quality prediction and process optimization tips.

Embodiments of the present invention provide a computer implemented method for generating a mold model for production predictive control. The proposed method in order to obtain injected given parts, also known as molded pieces, once a mold has been inserted in a first injection molding machine, comprises performing the following steps by a computing device having one or more processors and at least one memory:

a) receiving a first group of parameters from a plurality of injection molding machine sensors about performance of a plurality of injection cycles of said first injection molding machine, for example hydraulic pressure, screw position, screw speed, rotational speed, etc. parameters and a second group of parameters from a plurality of mold sensors relating to a mold cavity shaped for molding an injected given part in said first injection molding machine, said parameters of the second group at least including pressure and/or temperature evolution of the mold cavity and of the mold along each of the injection cycles in the mold cavity;
b) classifying each injection cycle of said plurality of injection cycles considering at least the received first and second group of parameters and quality or characteristics of the injected given parts;
c) processing the received first and second group of parameters by implementing therein one or more algorithms to remove undesired or irregular data values in said parameters;
d) merging the processed first group of parameters with the processed second group of parameters providing a global group of processed parameters;
e) executing a machine learning algorithm on the first group of parameters, on the second group of parameters, or on the global group of processed parameters generating an extended mold model, i.e. an enhanced AI mold model including mold features, machine features or both mold and machine features (intrinsic and extrinsic parameters that can affect an injection process) in which a learning step has been performed; and
f) using said generated extended mold model for further monitoring and control of the mold in further injection processes in the first injection molding machine and/or for optimizing a production process of the mold in the first molding machine. So, the model can offer recommendation tips and quality control in the first injection molding machine (the one that has been used to train and create the model).

That is, according to the principles of this invention the extended mold model is preferably generated by using mold cavity data and machine data. However, it should be noted that it is not necessary to have both data sources, although having both improves the accuracy/performance of the method.

The injection cycles, in step a), are performed with the first injection molding machine in a set of configurations providing different qualities of the injected given parts or different operation points of the first molding machine.

In an embodiment, the method further comprises using the generated extended mold model for further monitoring and control of the mold in further injection processes in at least one second injection molding machine (different to the first injection molding machine), and comparing an evolution of said first and/or second group of parameters in said at least one second injection molding machine with the generated extended mold model and further providing recommendations to obtain injected given parts of a given quality based on a result of said comparison.

The provided recommendations allow reaching a good quality part, or molded piece, in a shorter period of time, i.e. the process is speed up, so that, the proposed method optimizes the fine tuning of the mold.

Preferably, in said further injection processes performed in said at least one second injection molding machine, steps a) to e) are also executed and used to refine the generated extended mold model.

According to an embodiment, said step a) further comprises receiving a third group of parameters about additional sensors of the first injection molding machine such as hot runners, shop floor sensors, or humidity sensors, among others.

The reception of the first, second and also of the third group of parameters can be made at different periods of time or alternatively at the same time.

According to an embodiment, in said step b) the classification involves an additional evaluation of each injection cycle, indicating the first injection molding machine configuration. Moreover, in said step b), injected given parts having a quality above or below a given quality threshold are taken into account. That is, the proposed method takes into account both the pieces that have good quality and those having poor quality. Moreover, injected given parts including defects related for example to dimension or weight can be also considered.

In general, the number of injection cycles used in said classifying step involves from three to twenty cycles. Preferably the method performs five injection cycles.

According to the proposed method, the machine learning algorithm can comprise a Random Forest Tree algorithm, a Gradient Boosting algorithm, a Logistic Regression algorithm, a Support Vector Machine algorithm, an Adaboost algorithm, a KNN algorithm, a Decision Tree algorithm, a Naïve Bayes algorithm, a Gaussian Process Classifier, Ensemble models, or even a Neural network, among others. Besides, the one or more algorithms of step c) can include several mathematical operations at least comprising: compression techniques, noise filtering, derivation, feature selection, entropy analysis, complexity reduction, Discrete Cosine transformation, fast Fourier transform techniques, or other base functions representations at least including cFsm or Fourier series.

In an embodiment said compression techniques involve operations being performed in a frequency domain.

According to the proposed method, the computer device automatically calculates the best mold model and selects the better algorithm to boost the system performance.

That is, the computing device can execute different machine learning algorithms for a same mold and automatically select the extended mold model that provides an improved performance. Moreover, the computer device automatically detects if a sensor is not connected (or if it is wrongly connected) and recalculates the extended mold model.

Other embodiments of the invention that are disclosed herein also include software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

Therefore, present invention applies novel AI and Machine Learning techniques applied to the plastic manufacturing process to overcome the traditional approaches based on SPC/SQC that are now available in the market. Current solutions are mainly based on statistical analysis defining process operation windows. The invention can also be applied to other injection processes for other materials such as light alloys.

Moreover, present invention applies state of the art signal processing and data representation techniques to boost the performance of the machine learning algorithms.

Present invention can work with both mold and machine data. For analyzing the key parameters evolution along the injection cycle, present invention combines state of the art signal processing techniques, data fusion and machine learning algorithms.

Several injection molding machines and molds can be controlled/monitored in parallel, all being processed in a computing device, or centralized server.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF PREFERRED EMBODIMENTS

The proposed method provides a machine learning supervised approach that performs a training phase were a computing device, or server, (not shown in the figures), having one or more processors and at least one memory or database, learns and establishes hidden correlations to obtain, once a mold has been inserted in a first injection molding machine (preferred machine), injected given parts, also known as molded pieces.

Figure 1:
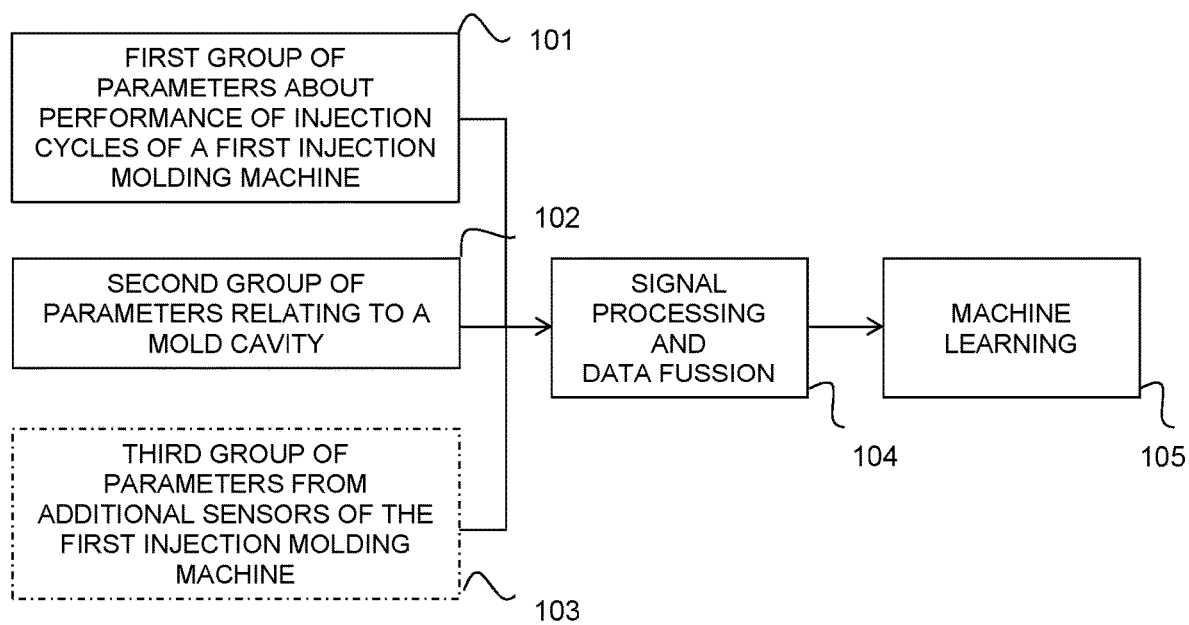
FIG. 1 schematically illustrates the different groups of parameters and operations that can be used and executed by the proposed method to generate a mold model for production predictive control.

According to the embodiment of FIG. 1, to generate the extended mold model the proposed method works with different groups of parameters about performance of injection cycles of a first injection molding machine 101 and about a mold cavity features 102 (and optionally about other sensors of the first injection molding machine 103); performs signal processing techniques and data fusion 104 on the received group of parameters; and applies machine learning algorithms 105. Therefore, an enhanced AI model including both mold cavity parameters and injection molding machine parameters is modelled and encoded that can be exported and updated.

It should be noted that in other embodiments, in this case not illustrated, the extended mold model can be generated by only considering one of said group of parameters 101, 102. That is, it is not mandatory for the method to work to have both data sources (mold cavity data and machine data). However, by working with both the accuracy/performance of the method is improved.

Figure 2:
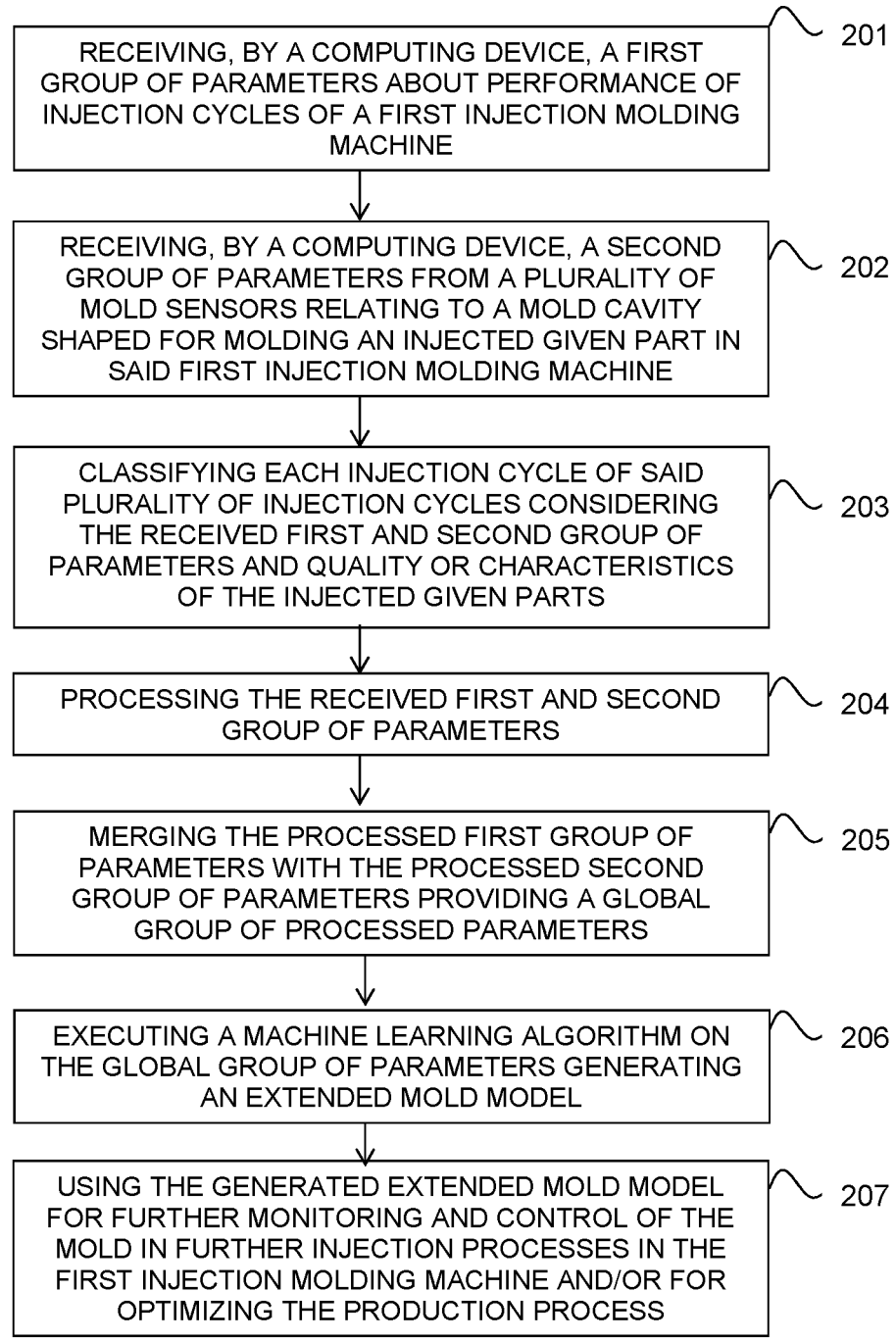
FIGS. 2 and 3 are flow diagrams illustrating different embodiments of the proposed method.

FIG. 2 illustrates an embodiment of the proposed method. According to this embodiment, first, the computing device, step 201, receives the first group of parameters about the performance of injection cycles in the first injection molding machine. Preferably, the method works with the cycle evolution of the hydraulic pressure, screw position, screw speed and rotational speed, not limitative as other type of available parameters in the injection molding machine can be also used. Then, at step 202, the computing device receives the second group of parameters relating to the mold cavity. Preferably, pressure and temperature evolution of the cavity and the mold along the injection cycle. At that point, step 203, the method performs an iterative classification step which includes classifying each injection cycle considering the received first and second group of parameters and quality or characteristics (defects, weight, dimension, etc.) of the injected given parts of the mold. Once all the input data is uploaded, the computer device, step 204, processes it by implementing one or more algorithms. This may include noise filtering; derivation; feature selection; entropy analysis; complexity reduction such as Principal Components Analysis (PCA), Partial Least Squares (PLS), etc.; Discrete Cosine transformation (DCT) which performs an inherent low band pass filtering, removing the undesired high frequency noise or other base functions representations (frequency domain and others) such as the FFT, the cFSM, etc. The output of the DCT has exactly the same number of coefficient as time stamps on the time domain data. In this case the coefficients are truncated to 10-50 depending on the case. This means a reduction on the data up to a factor of $10^3$. It should be noted that these numbers are only illustrative as they depend on the particular case. For instance, the reduction can be bigger $10^4$ if the cycle time or the sampling rate increases.

Once each group of parameters is preprocessed, the computing device, step 205, performs the data fusion to combine the different sensor data, meaning combining the different machine data streams and/or mold cavity, providing a global group of processed parameters. At this point, the computing device has the data ready to be modelled by the machine learning algorithm, step 206, to generate the extended mold model. For instance, a Random Forest Trees algorithm can be used. Other algorithms usable could be the Gradient Boosting, a Logistic Regression, Support Vector Machines, LDA, Ensemble models, among many others. The extended mold model is generated by fitting the algorithm. This fitted algorithm together with relevant process data (mold id, machine id, number of sensors, type of sensors, material id, etc.) is stored in a file of the extended mold model.

When the extended mold model is generated, it is used, step 207, for further monitoring and control of the mold in further injection processes in the first injection molding machine and/or for optimizing a production process of the mold in the first molding machine.

Figure 3:
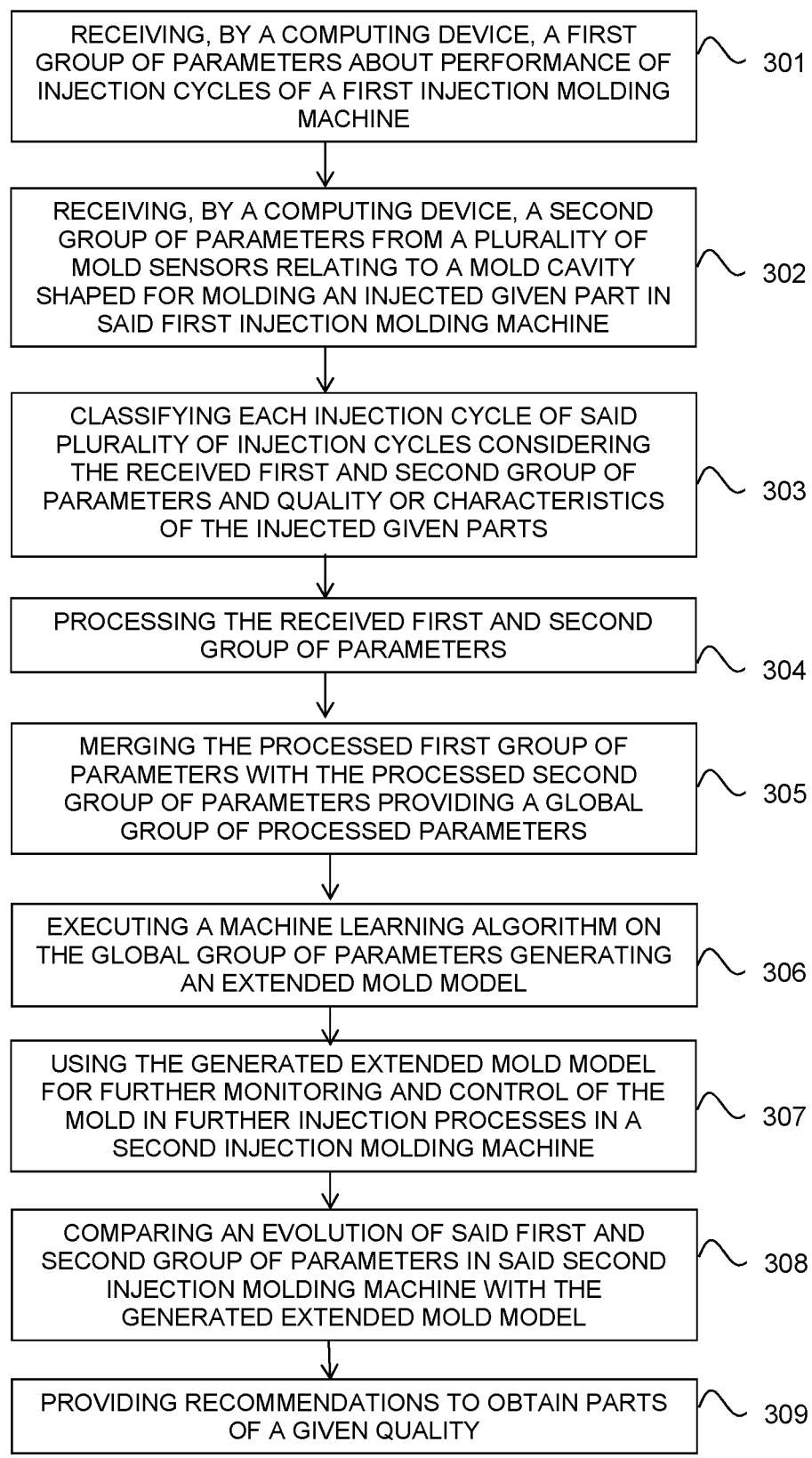

FIG. 3 illustrates another embodiment of the proposed method. In this case, different to the embodiment described in FIG. 2, when the extended mold model is generated, it is used, step 307, for further monitoring and control of the mold in further injection processes in a second injection molding machine (non-preferred machine). Finally, an evolution of the first and second group of parameters in the second molding machine is compared with the generated extended mold model, step 308, using a result of said comparison to provide further recommendations, step 309.

Following, different operation modes of the proposed method will be detailed.

Production Control System Operation:

The Production Control System (PCS) is the module in charge of monitoring and control the machine/mold performance in soft real time for ensuring an optimal productivity performance. The PCS evaluates the performance of the mold at injection cycle time, ensuring full traceability and a prediction of the quality of the injected part or the presence of the defects for which the system has been trained.

For each cycle, the PCS preferably analyses the whole evolution of the mold cavity pressure and/or temperature and the key machine parameters: injection speed and hydraulic pressure. Comparing them with the generated extended mold model by means of AI solutions allows for a near real time prediction of the quality of the part and allows for launching predictive and early alarms when the production suffers from undesired deviations.

PCS relays on supervised Machine Learning algorithms, meaning that a training phase where the raw data from the cycles plus the quality controls must be provided to the system in order to learn the hidden correlations that allow creating the extended mold model. Once the model is created, the system is ready to go into production where an automatic prediction of the quality is performed. This prediction improves the manufacturing process by triggering early alarms or warnings (e.g. for a given bad part or a given defect, etc.) when production deviations are detected in an early stage and thus improving productivity and decreasing downtimes and material waste.

Therefore, according to an embodiment, the PCS:
receives the real-time cycle data of the machine and mold sensors;
automatically loads the corresponding extended mold model based on the mold, machine and material ids;
applies the same mathematical operation(s) that were applied in the extended mold model generation;
stores the coefficients in said memory or database for guaranteeing full product traceability and at the same time, due to the high data compression when using base functions, saving memory space;
once all sensors are received, performs the same data fusion as when generating the extended mold model;
predicts the part quality applying the fitted machine learning model of the extended mold model;
based on the predicted classification and probabilities launches alarms or warnings, typically:
Alarm for bad part
Alarm for a given defect, etc.
by analyzing and performing a regression of the last j injection cycles class probability prediction, estimates if the production will suffer from deviations in the next z injection cycles
If a deviation that leads to bad parts in the following z cycles is estimated, an alarm is launched,
If a deviation that does not lead to bad parts but shows a system deviation is inferred, the system launches a warning.

Setup Predictive System Operation:

The Setup Predictive System (SPS) is the module in charge on helping an operator when a mold is installed in a different injection molding machine (second machine). The goal is to speed up it and thus reduce the scrap production and increasing and improving the scheduling flexibility of the injector.

Moreover, the SPS can provide machine tuning hints when production deviations occur even on the preferred injection molding machine, providing machine tuning recommendations both explicit and graphically. For instance: "increase the injection speed in a 10% for optimizing the setup". SPS requires from mold cavity sensors for an optimal performance and can work with both mold cavity parameters and machine parameters.

Therefore, according to an embodiment, the SPS:
receives the real-time cycle data of the machine and mold sensors;
automatically loads the corresponding extended mold model based on the mold, machine and material ids;
applies the same the same mathematical operation(s) that were applied in the extended mold model generation;
stores the coefficients in the memory or database for guaranteeing full product traceability and at the same time, due to the high data compression when using base functions, saving memory space;
once all sensors are received, performs the same data fusion as when generating the extended mold model;
predicts the machine configuration applying the fitted machine learning model of the extended mold model;
based on the predicted machine configuration, launces recommendation messages and generates user friendly graphic information, for example, plots the estimated value of the machine configuration parameters, recommends the tuning % of the most critical parameter, etc.
by analyzing and performing a regression of the last j injection cycles class probability prediction, estimates if the production will suffer from deviations in the next z injection cycles
If a deviation that leads to a >threshold change in a machine parameter, generates and alarm,
If a deviation that does not lead to bad parts but shows a system deviation is inferred, the system launches a warning.

The alarms, plots, and/or recommendations can be stored in the memory or database.

According to the proposed method, the computer device automatically calculates the best mold model and selects the better algorithm to boost the system performance. Moreover, the computer device automatically detects if a sensor is not connected and recalculates the generated extended mold model.

The proposed invention may be implemented in hardware, software, firmware, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

As used herein, computer program products comprising computer-readable media including all forms of computer-readable medium except, to the extent that such media is deemed to be non-statutory, transitory propagating signals.

The scope of the present invention is defined in the following set of claims.

What is claimed is:

1. A computer implemented method for generating a mold model for production predictive control, the method comprising performing, by a computer device, once a mold has been inserted in a first injection molding machine, in order to obtain, injected given parts, or molded pieces, the following steps:

a) receiving
  i. a first group of parameters from a plurality of injection molding machine sensors about performance of a plurality of injection cycles of said first injection molding machine,
     wherein said injection cycles are performed with the first injection molding machine in a set of configurations providing at least different qualities of the injected given parts or different operation points, and
     wherein said parameters of the first group include at least one of Hydraulic Pressure, Screw Position, Screw Speed or Rotational Speed; and
  ii. a second group of parameters from a plurality of mold sensors relating to a mold cavity shaped for molding an injected given part in said first injection molding machine, said parameters of the second group at least including pressure and/or temperature evolution of the mold cavity and of the mold along each of the injection cycles in the mold cavity;
b) classifying each injection cycle of said plurality of injection cycles considering at least the received first and second group of parameters and quality or characteristics of the injected given parts;
c) processing the received first and second group of parameters by implementing therein one or more algorithms to remove undesired or irregular data values in said parameters;
d) merging the processed first group of parameters with the processed second group of parameters providing a global group of processed parameters;
e) executing a machine learning algorithm on the global group of processed parameters generating an extended mold model; and
f) using said generated extended mold model for further monitoring and control of the mold in further injection processes in the first injection molding machine and/or for optimizing a production process of the mold in the first molding machine.

2. The method of claim 1, further comprising:
g) using said generated extended mold model for further monitoring and control of the mold in further injection processes in at least one second injection molding machine different to the first injection molding machine and/or for optimizing the production process of the mold in the second injection molding machine; and
h) comparing an evolution of said first and/or second group of parameters in said at least one second injection molding machine with the generated extended mold model and further providing recommendations to obtain injected given parts of a given quality based on a result of said comparison.

3. The method of claim 2, wherein in said further injection processes performed in said at least one second injection molding machine, steps a) to e) are further executed and used to refine the generated extended mold model.

4. The method of claim 1, wherein said step a) further comprises receiving a third group of parameters regarding additional sensors of the first injection molding machine including hot runners, shoopfloor sensors, or humidity sensors.

5. The method of claim 4, wherein the first, second and third group of parameters are simultaneously received.

6. The method of claim 1, wherein in said step b) the classification involves an additional evaluation of each injection cycle indicating the first injection molding machine configuration.

7. The method of claim 1, wherein in said step b) injected given parts having a quality above or below a given quality threshold are considered, as well as injected given parts including defects related to dimension or weight.

8. The method of claim 1, wherein the number of injection cycles used in said classifying step is at least three.

9. The method of claim 1, wherein said machine learning algorithm comprises a Random Forest Tree, a Gradient Boosting, a Logistic Regression, a Support Vector Machine, Adaboost, KNN, Decision Tree, a Naïve Bayes algorithm, a Gaussian Process Classifier, a Neural network or Ensemble models.

10. The method of claim 9, wherein in step e) the computing device executes a plurality of machine learning algorithms, the method further comprising automatically selecting the generated extended mold model that provides an improved performance.

11. The method of claim 1, wherein the one or more algorithms of step c) include several mathematical operations comprising: compression techniques, noise filtering, derivation, feature selection, entropy analysis, complexity reduction, Discrete Cosine transformation, fast Fourier transform techniques, or other base functions representations at least including cFsm or Fourier series.

12. The method of claim 11, wherein said compression techniques of step c) involve operations being performed in a frequency domain.

13. The method of claim 1, wherein the processing in step c) is performed separately for each group of parameters.

14. The method of claim 1, further comprising automatically and dynamically detecting, by the computer device, when a sensor of the first injection molding machine is not connected, the computer device further recalculating the generated extended mold model based on said detection.

15. The method of claim 1, wherein in step e) the computing device executes a plurality of machine learning algorithms, the method further comprising automatically selecting the generated extended mold model that provides an improved performance.

16. A computer program product tangibly embodied in a non-transitory machine-readable storage medium including code instructions that, when executed by at least one processor of a computer system implements a method for generating a mold model for production predictive control, by performing, once a mold has been inserted in a first injection molding machine, in order to obtain, injected given parts, or molded pieces, the following steps:
a) receiving
  i. a first group of parameters from a plurality of injection molding machine sensors about performance of a plurality of injection cycles of said first injection molding machine,
     wherein said injection cycles are performed with the first injection molding machine in a set of configurations providing at least different qualities of the injected given parts or different operation points, and
     wherein said parameters of the first group include at least one of Hydraulic Pressure, Screw Position, Screw Speed or Rotational Speed; and
  ii. a second group of parameters from a plurality of mold sensors relating to a mold cavity shaped for molding an injected given part in said first injection molding machine, said parameters of the second group at least including pressure and/or temperature evolution of the mold cavity and of the mold along each of the injection cycles in the mold cavity;

b) classifying each injection cycle of said plurality of injection cycles considering at least the received first and second group of parameters and quality or characteristics of the injected given parts;
c) processing the received first and second group of parameters by implementing therein one or more algorithms to remove undesired or irregular data values in said parameters;
d) merging the processed first group of parameters with the processed second group of parameters providing a global group of processed parameters;
e) executing a machine learning algorithm on the global group of processed parameters generating an extended mold model; and
f) using said generated extended mold model for further monitoring and control of the mold in further injection processes in the first injection molding machine and/or for optimizing a production process of the mold in the first molding machine.

\* \* \* \* \*